United States Patent [19]

Hay

[11] Patent Number: 5,004,963
[45] Date of Patent: Apr. 2, 1991

[54] ACCELEROMETER BASED POWER CONTROL APPARATUS FOR AIRCRAFT SUBSYSTEM

[75] Inventor: Wayne R. Hay, Pleasant Hill, Calif.

[73] Assignee: Systron Donner Corporation, Concord, Calif.

[21] Appl. No.: 493,136

[22] Filed: Mar. 13, 1990

[51] Int. Cl.⁵ .................... H02J 7/00; H01H 35/14
[52] U.S. Cl. ........................ 320/13; 307/10.7; 307/121
[58] Field of Search .......... 320/13; 307/10 BP, 116, 307/117, 121

[56] References Cited

U.S. PATENT DOCUMENTS

| | | | |
|---|---|---|---|
| 3,803,475 | 4/1974 | Anichini | 320/13 |
| 3,967,180 | 6/1976 | Weber et al. | 320/13 |
| 4,207,511 | 6/1980 | Radtke | 320/61 X |
| 4,581,571 | 4/1986 | Hansen | 320/13 |
| 4,849,655 | 7/1989 | Bennett | 307/362 X |

Primary Examiner—R. J. Hickey
Attorney, Agent, or Firm—Flehr, Hohbach, Test, Albritton & Herbert

[57] ABSTRACT

An accelerometer based power control apparatus for use in an aircraft subsystem (where the subsystem may be a fire extinguishing system) utilizes an independent battery source. The battery is connected to the aircraft subsystem only during the flight of the aircraft by a positive indication of an associated accelerometer which closes a switch connecting the battery to the aircraft subsystem.

4 Claims, 2 Drawing Sheets

ACCELEROMETER BASED POWER CONTROL APPARATUS FOR AIRCRAFT SUBSYSTEM

The present invention is directed to a power control apparatus for an aircraft subsystem, and more particularly where an accelerometer connects a powering battery to the aircraft subsystem.

BACKGROUND OF THE INVENTION

Where stand alone or independent electrical batteries are desired to power an electrical subsystem in an aircraft, battery life is of course a problem. And an electrical battery source independent from the existing electrical system of the aircraft may be desired, especially where retrofitting of the aircraft is done.

In general, it is well known that when the aircraft is on the ground it doesn't normally require any power.

The foregoing is illustrated by U.S. Pat. No. 4,581,571 granted to James E. Hansen entitled "Electrical Power Disconnect System." And that patent discloses a system that opens the main battery switch of the aircraft when the plane is on the ground. Normally the pilot would open such main battery switch. But if this is not done, the Hansen patent provides that conditions such as weight being on the wheels of the plane will automatically open the battery switch to thereby void "unnecessary depletion of the battery." The Hansen system, however, does not deal with a stand alone subsystem on the aircraft but the main battery; moreover, it is sensitive to a ground condition and not to a "flight" condition.

OBJECT AND SUMMARY OF INVENTION

It is a main object of the present invention to provide an improved power control apparatus for an aircraft subsystem.

In accordance with the above object, there is provided a power control apparatus for an aircraft subsystem comprising self-contained and independent electrical battery means carried by the aircraft. The aircraft subsystem is powered exclusively by the battery means. Switching means are responsive to vibration or acceleration of the aircraft for electrically connecting the battery means to the aircraft subsystem to power the subsystem. Thus, the battery means power the subsystem only during the flight of the aircraft to prolong battery life.

BRIEF DESCRIPTION OF DRAWINGS

FIG. 1 is a block diagram embodying the present invention.

FIG. 2 is a detailed schematic of FIG. 1.

DETAILED DESCRIPTION OF PREFERRED EMBODIMENT

Figures 1, 2:
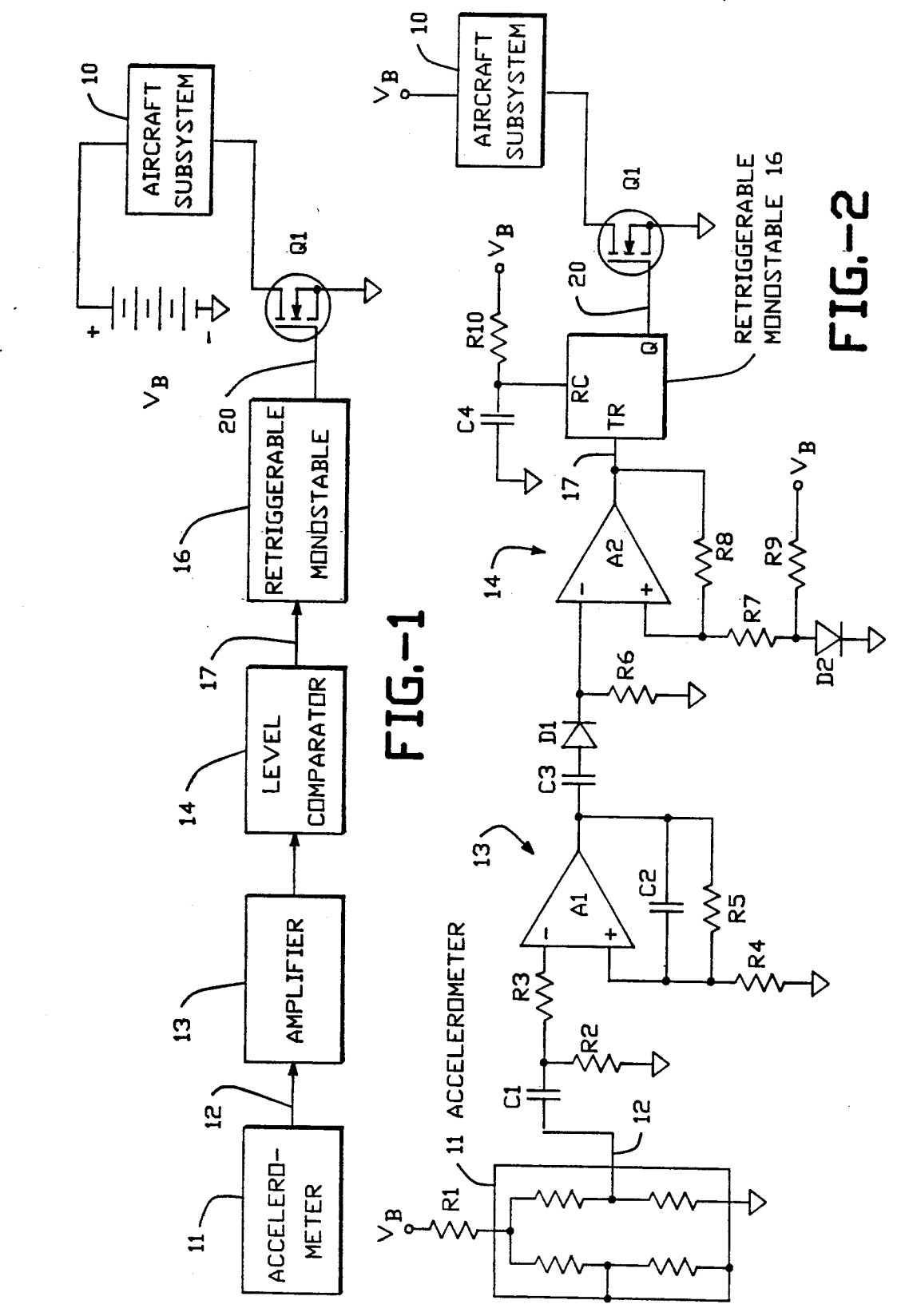
Figure 3:
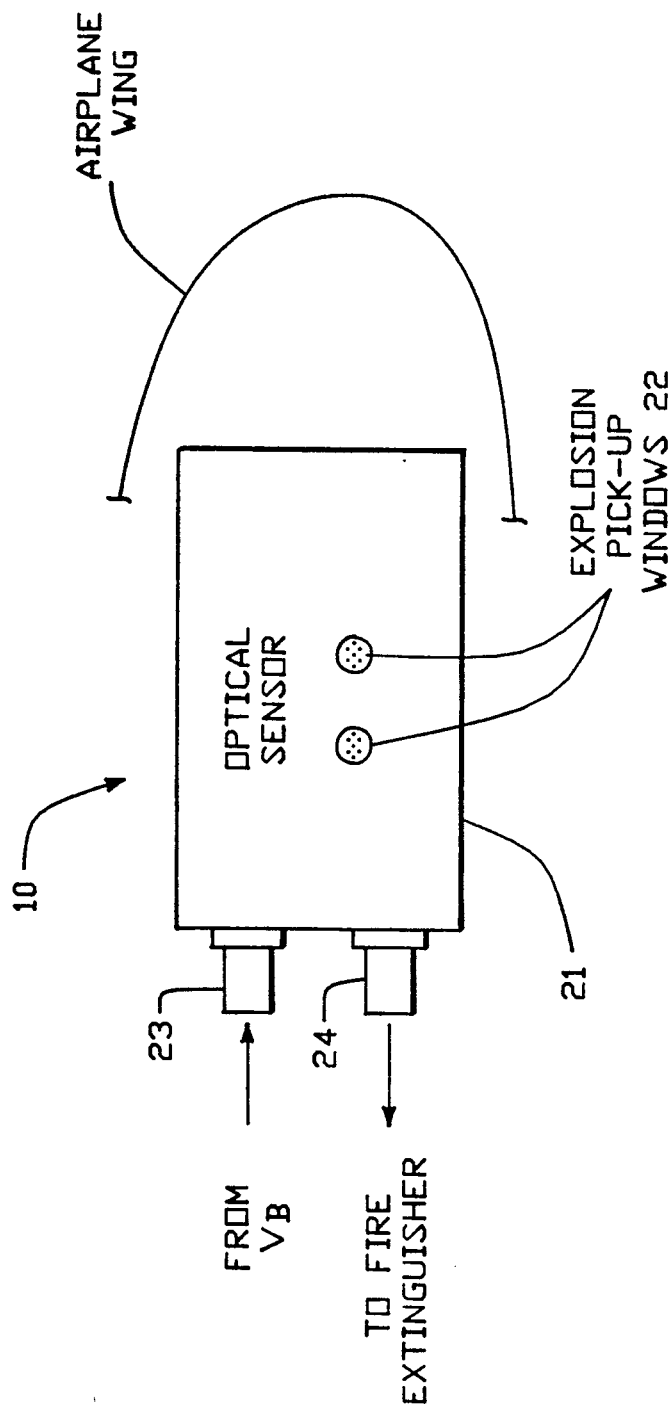
FIG. 3 is a block diagram showing a typical aircraft subsystem, as installed in the wing of an aircraft.

FIG. 1 illustrates a generalized aircraft subsystem 10 which is powered by a self-contained and independent battery designated $V_B$. A field effect transistor switch Q1 connects the subsystem to common ground, thereby completing the power circuit to the aircraft subsystem 10. The battery $V_B$ may typically be of the lithium type, having a capacity of 3 ampere hours.

Switch Q1, when open, of course disconnects the subsystem from common and the battery $V_B$ has its life prolonged since there is no depletion of its energy.

Switch Q1 is basically controlled by a switching circuit, including accelerometer 11 which is responsive to vibration or motion of the aircraft. During flight or operation of the aircraft it produces an output on line 12 which is amplified by amplifier 13, passes through a level comparator 14 which drives a retriggerable monostable unit 16. As long as an output signal of sufficient level is produced by accelerometer 11 on line 12, a continuous trigger input is provided on line 17 to close the switch Q1 by output 20 of monostable unit 16 connecting the aircraft subsystem 10 to its power source $V_B$.

This power source, as better shown in FIG. 2, at the same time is of course permanently connected to the switching circuit. However, by the use of CMOS circuitry, the continuous power drain is minimal being for example, 6 milliampere hours per day.

Referring to the detailed circuitry of FIG. 2, accelerometer 11 is connected to $V_B$ through a resistor R1. The accelerometer consists of four piezoresistive elements indicated with arrows and is available commercially as Model 3031 from IC Sensors, a corporation of Milpitas, Calif. It requires a very small current in the microampere range. An indicated RC network connects its output on line 12 to amplifier 13, which in turn is connected through capacitors C3 and diode D1 to a level comparator 14. Amplifier 13 has an adjustable gain which provides for sensitivity adjustment. The level comparator 14 compares the amplified signal and triggers the monostable unit 16 on its trigger input $T_R$. And then the Q output of the monostable unit 16 drives the switching input 20 of field effect transistor Q1. The monostable unit 16 is retriggerable, meaning that the Q output 20 can be maintained high indefinitely without toggling as long as its input TR is triggered continuously with trigger interval not greater than time period determined by RC timing network C4 and R10. Continuously toggling of the Q output is undesireable since each toggle would result in power resetting of the subsystem which in turn causes a delay in operation.

Thus, in operation as long as there is a continuous trigger input due to aircraft vibration the FET switch Q1 energizes the aircraft subsystem by connecting the battery $V_B$.

Accelerometer 11, although being mainly responsive to vibration, also responds to changes in motion of the aircraft. But more importantly, it is a positive indication that the aircraft is in flight; thus, it ensures that the aircraft subsystem, which is of critical importance during flight conditions, is activated. FIG. 3 illustrates a typical aircraft subsystem 10 which is a fire extinguishing system. It would be installed, for example, in the airplane wing and would include an optical sensor unit 21 having the pickup windows 22 responsive to an explosive condition in the aircraft wing (for example, due to explosive shells penetrating the wing). The battery power of $V_B$ is supplied through the coupling 23 and a fire extinguishing electrical output to a fire extinguisher (also in the wing) via the coupler 24.

The rationale for the stand alone independent battery system (independent from the main electrical power of the aircraft) is apparent with a fire extinguishing system; for example, damage to the main electrical system must not affect operation of the fire extinguishing subsystem.

The present invention, as referenced above, is especially useful in retrofitting existing planes; such as the F16 fighter aircraft.

With the improved circuit of the present invention, with lithium batteries indicated with a three ampere-hour capacity, assuming that an aircraft subsystem requires a current of 10 milliamperes and the plane is flown two hours a day, this means that 20 milliamperes hours of energy are consumed per day. With the standby current for the switching system of 6 milliampere hours per day, this means that 26 milliampere hours per day are consumed. Thus, 115 days of battery life may be expected.

In comparison, without the present invention where there is a continuous drain by the sensor operating twenty-four hours a day there is 240 milliampere hours energy consumption per day giving a life of the above lithium battery of 12.5 days. Thus, the invention provides for extension of battery life by an order of magnitude given typical operation of an aircraft.

What is claimed is:

1. Power control apparatus for an aircraft subsystem comprising:

self-contained and independent electrical battery means carried by said aircraft, said aircraft subsystem being powered exclusively by said battery means;

switching means responsive to vibration or acceleration of said aircraft for electrically connecting said battery means to said aircraft subsystem to power said subsystem, whereby said battery means powers said subsystem only during flight of said aircraft to prolong battery life.

2. Power control apparatus for an aircraft subsystem as in claim 1 where said switching means includes an accelerometer responsive to said vibration or acceleration.

3. Power control apparatus for an aircraft subsystem as in claim 2 where said switching means includes monostable switching means driven by an output from said accelerometer resulting from said vibration for connecting said battery means to said subsystem.

4. Power control apparatus for an aircraft subsystem as in claim 3 where said switching means includes a level comparator responsive to said output of said accelerometer for driving said monostable switching means.

* * * * *